No. 786,343.

Patented April 4, 1905.

UNITED STATES PATENT OFFICE.

CHARLES DE BÜREN, OF GENEVA, SWITZERLAND.

GOLF-BALL.

SPECIFICATION forming part of Letters Patent No. 786,343, dated April 4, 1905.

Application filed May 26, 1904. Serial No. 209,981.

*To all whom it may concern:*

Be it known that I, CHARLES DE BÜREN, gentleman, of Geneva, Switzerland, have invented certain new and useful Improvements in and Relating to Golf-Balls, of which the following is a specification.

The invention relates to an improved construction and manufacture of golf-balls; and the invention consists of making the said golf-ball of celluloid or of a mixture of celluloid with a suitable quantity of other materials so as to provide golf-balls of the prescribed diameter and weight and having the indispensable elasticity.

As is well known, golf-balls are required to have a certain outer diameter and at the same time a certain weight and a certain degree of elasticity. In order to meet these requirements, numerous combinations of solid as well as of hollow spheres with suitable coatings or coverings have been manufactured heretofore. Pure celluloid has been employed to cover a core of other material or to form the core itself provided with a covering of other material; but the manufacture of such golf-balls is very complicated and irregular, the result being that the three essential properties—predetermined diameter, weight, and elasticity—are different in one ball from that in another ball of the same lot, which is very annoying to the player.

According to the present invention the golf-ball is a hollow sphere of homogeneous material which possesses the necessary properties—that is to say, combines with the prescribed diameter of from forty to forty-five millimeters the proper weight of from forty to forty-five grams and the proper degree of elasticity.

My new golf-ball consists of a homogeneous hollow sphere having a composition of the following ingredients made up in the following proportions: seventy per cent. pure celluloid and thirty per cent. of a salt of lead, as the sulfate ($PbSO_4$) or the carbonate, ($PbCO_3$.) Forty to forty-five grams of this mixture is poured in the usual manner into a suitable mold to form a hollow sphere, the outer surface of which may be corrugated or striated, as desired.

What I claim is—

1. A golf-ball in the form of a hollow sphere made up of about seventy per centum of pure celluloid and about thirty per centum of a salt of lead.

2. A golf-ball in the form of a hollow sphere and made up of a homogeneous mixture of pure celluloid, seventy parts, and of lead carbonate, thirty parts.

3. As a new composition for the making of golf-balls, a mixture of about seventy per centum of pure celluloid with a salt of lead having a specific gravity greater than 1.3.

4. As a new composition for the making of golf-balls, a mixture of about seventy per centum of pure celluloid with about thirty per centum of lead carbonate ($PbCO_3$.)

In testimony whereof I have signed my name to this specification in the presence of two subscribing witnesses.

CHARLES DE BÜREN.

Witnesses:
G. IMER-SCHNEIDER,
L. H. MUNIER.